United States Patent
Amery et al.

[11] Patent Number: 6,152,739
[45] Date of Patent: Nov. 28, 2000

[54] VISUAL DISPLAY SYSTEM FOR PRODUCING A CONTINUOUS VIRTUAL IMAGE

[75] Inventors: John G. Amery, Elsberry; John A. VanHoogstrate, St. Peters; Michael E. Stockton, Bland, all of Mo.

[73] Assignee: McDonnell Douglas Corporation, St. Louis, Mo.

[21] Appl. No.: 09/197,025

[22] Filed: Nov. 20, 1998

[51] Int. Cl.[7] ............................... G09B 9/08; G09B 19/16
[52] U.S. Cl. ................................. 434/38; 434/29; 434/44; 345/1; 348/36
[58] Field of Search .................................. 434/23, 24, 29, 434/30, 35, 38, 43, 44, 519, 220, 322, 336, 365, 372; 273/434, 148 B; 345/1, 7, 156, 157, 158, 427, 473; 348/36, 39, 121, 383, 580; 382/113, 284, 552; 396/322; 359/10, 24, 34, 258, 407, 482, 630, 640

[56] References Cited

U.S. PATENT DOCUMENTS

| | | |
|---|---|---|
| 4,246,605 | 1/1981 | La Russa . |
| 4,295,159 | 10/1981 | Carolla et al. . |
| 4,352,664 | 10/1982 | Morrison et al. . |
| 4,463,380 | 7/1984 | Hooks, Jr. ............................... 348/580 |
| 4,473,355 | 9/1984 | Pongratz . |
| 4,634,384 | 1/1987 | Neves et al. . |
| 4,775,859 | 10/1988 | Starkey, IV et al. . |
| 4,919,518 | 4/1990 | Ogino et al. . |
| 5,011,277 | 4/1991 | Ogino et al. . |
| 5,130,794 | 7/1992 | Ritchey ..................................... 348/39 |
| 5,137,450 | 8/1992 | Thomas . |
| 5,179,440 | 1/1993 | Loban et al. . |
| 5,242,306 | 9/1993 | Fisher . |
| 5,320,534 | 6/1994 | Thomas . |
| 5,320,538 | 6/1994 | Baum . |
| 5,341,229 | 8/1994 | Rowan ...................................... 359/10 |
| 5,487,665 | 1/1996 | Lechner et al. . |
| 5,565,882 | 10/1996 | Takanashi et al. . |
| 5,585,967 | 12/1996 | Monroe . |
| 5,619,373 | 4/1997 | Meyerhofer et al. ................... 359/482 |
| 5,626,410 | 5/1997 | Chambers et al. . |
| 5,655,909 | 8/1997 | Kitchen et al. . |
| 5,746,599 | 5/1998 | Lechner . |
| 5,926,153 | 7/1999 | Ohishi et al. ............................... 345/1 |
| 5,982,352 | 11/1999 | Pryor ...................................... 345/156 |

FOREIGN PATENT DOCUMENTS

| | | |
|---|---|---|
| 2063878 | 12/1997 | Canada . |
| 0 514 045 B1 | 3/1998 | European Pat. Off. . |

Primary Examiner—Joe H. Cheng
Attorney, Agent, or Firm—Bryan Cave LLP

[57] ABSTRACT

A visual display system for producing a continuous far-focused virtual image according to the present invention includes a number of adjacent video image generation and display modules. Each module includes an image generator that generates a video image representative of a portion of a composite display image displayed on a video display. The visual display system also includes a number of optical viewing lenses associated with each video image generation and display modules and positioned between the operator and the video display. The lenses restrict the operator's field of view such that the operator views only a portion of the active display area of the video displays. The lenses of adjacent modules are joined together along their edges to form an enclosure partially surrounding the operator so that the operator views the composite display image displayed on the video displays through the lenses and perceives the composite display image as a continuous far-focused virtual image.

25 Claims, 4 Drawing Sheets

VISUAL DISPLAY SYSTEM FOR PRODUCING A CONTINUOUS VIRTUAL IMAGE

FIELD OF THE INVENTION

The present invention relates generally to visual display systems and methods and, more particularly, to a system for displaying continuous virtual images.

BACKGROUND OF THE INVENTION

Visual display systems are commonly used to simulate training environments where training through actual operations would be dangerous, expensive or otherwise impractical. One common application for visual display systems is flight simulation and training systems. A typical flight simulation and training system requires visual "out the window" images simulating the terrain, landscape, cultural features, buildings, vehicles, and other aircraft in the simulated vicinity of the trainee. One form of conventional flight simulator includes the projection of images onto the inside of a large spherically-shaped dome or partial dome structure. The images are displayed inside the domes using multiple video projectors and associated optical devices mounted inside the domes. These projectors and optics must be carefully positioned inside the domes in order to properly display the simulated images. Another conventional form of a flight simulator typically includes one or more video display screens onto which video images are projected by one or more projectors, such as cathode ray tubes. The video images may be projected onto the display screens from either the front or the rear of the screens. An example of such a conventional flight simulator is the Virtual Image Display Simulator (VIDS), manufactured by The Boeing Company, the assignee of the current invention. The VIDS provides four rear-projected video screens positioned a few feet from the trainee used to display simulated images in front of the trainee and up to three additional rear-projected display screens used to display simulated images behind the trainee. Conventional flight simulators also usually include a control panel and a control stick and throttle for providing input to the visual display system in response to the displayed video images. The control panel and surrounding pilot environment are often realistic simulations of the controls and displays present in the actual aircraft. Thus, the operator can simulate the flight of an aircraft and can respond to the environment as depicted by the visual display.

One primary objective of flight simulators is to enhance and optimize the simulated images to present the operator with a high fidelity and realistic training environment. Problems experienced by conventional flight simulators include diminished brightness and contrast, and a low resolution of the projected images. These problems arise in large part because of the capability of conventional video projectors, and the use of a relatively small number of video screens (necessitating that each video projector project a relatively large image). Additionally, conventional flight simulators generally provide a simulated image that is focused relatively close to the trainee's eyes, and not at a far distance. An improved flight simulator would produce a virtual image that is focused at or near infinity so that the virtual image appears sufficiently real to the simulation pilot. Such an improved flight simulator would be of great assistance to one particular simulation scenario, namely air-to-ground training, which requires eye-limited resolution, i.e., display resolution that meets or exceeds the resolution of the human eye. Another drawback to conventional flight simulators is the size of the projectors, display screens, and associated electronics and optics. An improved flight simulator would have a reduced overall size, allowing the entire simulator to be located in a small room, thus reducing the cost of installing and operating the flight simulator.

For the foregoing reasons, there is a strong need for an improved visual system for use, for example, as a flight simulator. Preferably, the system would have enhanced brightness, contrast and resolution over existing visual systems and produce a virtual image focused at or near infinity. A preferred visual system would be of relatively compact size and designed using upgradeable, commercially-available components.

SUMMARY OF THE INVENTION

The above-mentioned needs are met by the present invention, which provides a compact visual display system producing a composite display image that is perceived by a simulation pilot or other operator as a far-focused, continuous virtual image of high resolution, brightness and contrast. Preferably, the visual display system is used as part of a flight simulator operated by a simulation pilot positioned in a predetermined viewing volume and having an associated field of view concentrically surrounding a line of sight extending outwardly from the pilot's viewing volume.

In a preferred embodiment, the visual display system provides out-the-window visual imagery and incorporates a plurality of adjacent video image generation and display modules that include an image generator that generates a video image. Preferably, the video image generated by each of the image generators is representative of a portion of the composite display image that is displayed to the operator. The video image generation and display modules also preferably include a video display, for example, a flat panel video display that is operatively connected to, and responsive to the video image generated by, an image generator. Each of the video displays preferably displays a portion of the composite display image. The preferred visual display system also includes a plurality of lenses, such as, for example, positive aspheric Fresnel type optical lenses. Each of the lenses is associated with one of the image generation and display modules and is preferably positioned between the operator and one of the video displays. The lens restricts the operator's field of view such that the operator views only a portion of the display area of the video display. Preferably, the image generation and display modules are arranged into an array in front of, or partially surrounding, the operator and the lenses are joined together along their edges to form an enclosure partially surrounding the operator so that the operator views the composite display image displayed on the plurality of video displays through the plurality of optical lenses. Preferably, each optical lens is designed such that its focal length allows the operator to view the composite display image focused at or near infinity in order to present the operator with a realistic visual simulation.

In a preferred embodiment of the visual display system, a portion of the image displayed on each video display overlaps a portion of the image displayed on its adjacent video displays. In this embodiment, each optical lens is positioned such that the operator views only the image displayed on the display area of each video display that does not overlap any of the image viewed by the operator on adjacent video displays. Using this preferred embodiment, the operator may move or rotate his head and the system will continue to provide an image that appears as a continuous virtual image displayed across the plurality of video displays.

Preferably, the visual display system incorporates optical lenses having planar surfaces with five or six sides, i.e., pentagonal or hexagonal shapes. These preferred shapes allow the lenses to be arranged so that they tessellate a sphere partially or completely surrounding the operator. The lenses are preferably positioned and oriented parallel to their associated video displays and perpendicular to a line extending from the operator's viewing position to the center of their associated video displays. The use of the preferred shapes allows the lenses to be arranged such that all sides of the optical lenses completely intersect with the sides of the lenses of adjacent modules providing the operator with a continuous virtual image.

The visual system may also include a database accessed by the image generators to generate the video image. The display system further preferably includes a display system controller for providing each image generation and display module with an index into the database so that the image generators can access data from the database associated with the portion of the composite display image displayed on the video displays.

Additionally, the present invention includes a method of presenting far-focused virtual images. The preferred method includes the step of generating a plurality of video images, wherein each video image is representative of a portion of the composite display image. A plurality of video displays are arranged into an array, each video display providing one of the plurality of video images. A plurality of lenses, such as, for example, positive aspheric optical lenses, are arranged and positioned between the operator and the video displays to restrict the operator's field of view such that the operator views only a portion of the total display area of the video displays. Preferably, the optical lenses are arranged such that their edges are joined together to form an enclosure partially or completely surrounding the operator so that the operator views the composite display image displayed on the plurality of video displays through the plurality of optical lenses, which is then perceived by the operator as a continuous virtual image.

BRIEF DESCRIPTION OF THE DRAWINGS

These and other features, aspects, and advantages of the present invention will become better understood with regard to the following description, appended claims, and accompanying drawings wherein:

These drawings are provided for illustrative purposes only and should not be used to unduly limit the scope of the present invention.

DETAILED DESCRIPTION OF THE INVENTION

As described herein in a preferred embodiment, the visual display system can be used as part of a flight simulation system that is employed to train military, commercial or other personnel to fly aircraft. The principles of the visual display system described herein, however, can also be employed to simulate other environments and to train personnel for other operations without departing from the spirit and scope of the present invention. Additionally, the visual display system can be employed in other industries, such as, for example, the entertainment industry when as a video display-based arcade-type game or a theme park ride, and the advertising industry when used as a video wall.

Figure 1:
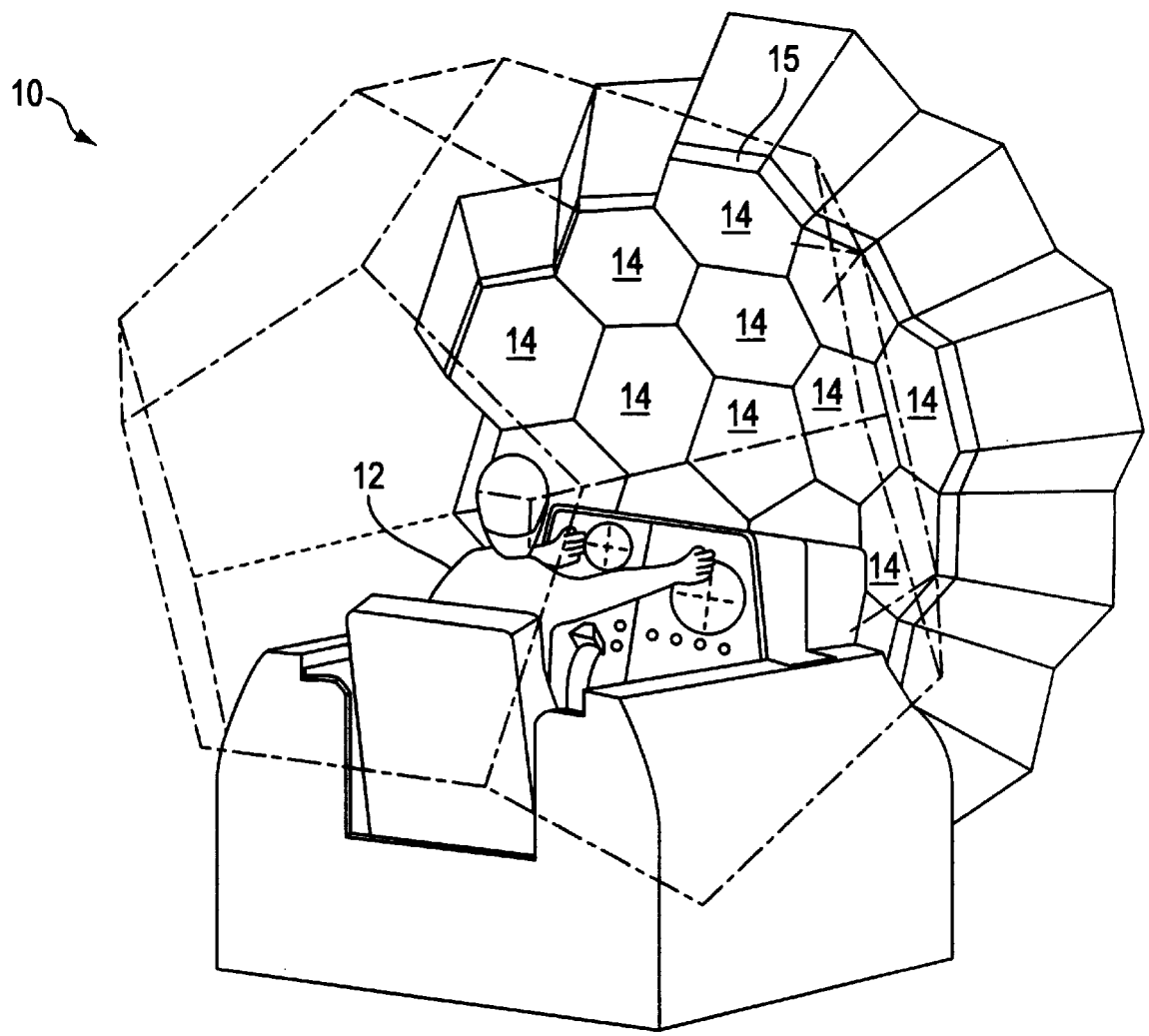
FIG. 1 is a perspective view of the presently preferred visual display system as incorporated into a flight simulator.

As shown in FIG. 1, the visual display system 10 is preferably used in conjunction with a flight simulation system used to train aircrew to fly and operate an aircraft. The flight simulation system typically includes a simulation pilot 12 seated at a predetermined viewing location facing, or surrounded by, an array of image generation and display modules 14. As in a conventional flight simulator, the pilot 12 may move his head during the simulation system within a three-dimensional space known as a viewing volume. As further described below, the image generation and display modules 14 include appropriate electronics and computer equipment to generate a video image and display the image to the pilot 12. Thus, the array of image generation and display modules 14 generate and display an appropriate "out-the-window" scenario simulating the outdoor environment that might be typically seen by the pilot flying an actual aircraft. This computer-generated scenario typically includes the terrain, landscape, cultural features, buildings, vehicles, and other simulated aircraft flying in the vicinity of the pilot's simulated position. Preferably, each image generation and display module 14 generates and displays a portion of the overall out-the-window image so that the array of modules will display the overall images as a composite display image to the pilot 12. The image generation and display modules 14 are preferably arranged side-by-side in an array fashion completely or partially surrounding the pilot 12 to provide a continuous image (forming up to a 360 degree solid angle) as viewed from the pilot's 12 predetermined viewing volume. The image generation and display modules 14 are preferably mounted in a supporting structure 15 designed to hold each of the modules 14. As is customary, the pilot 12 may also be provided with a conventional or simulated cockpit comprised of an array of cockpit components such as a throttle and flight stick (having associated controls and switches), a number of head-down cockpit displays displaying various navigation, situational and tactical information, and either a real or simulated head-up display. The pilot 12 is preferably positioned in a predefined viewing volume facing the array of image generation and display modules 14. The pilot 12 has an associated field of view concentrically surrounding a line of sight extending outwardly from the pilot's viewing volume in a direction toward the array of modules 14.

Figure 2:
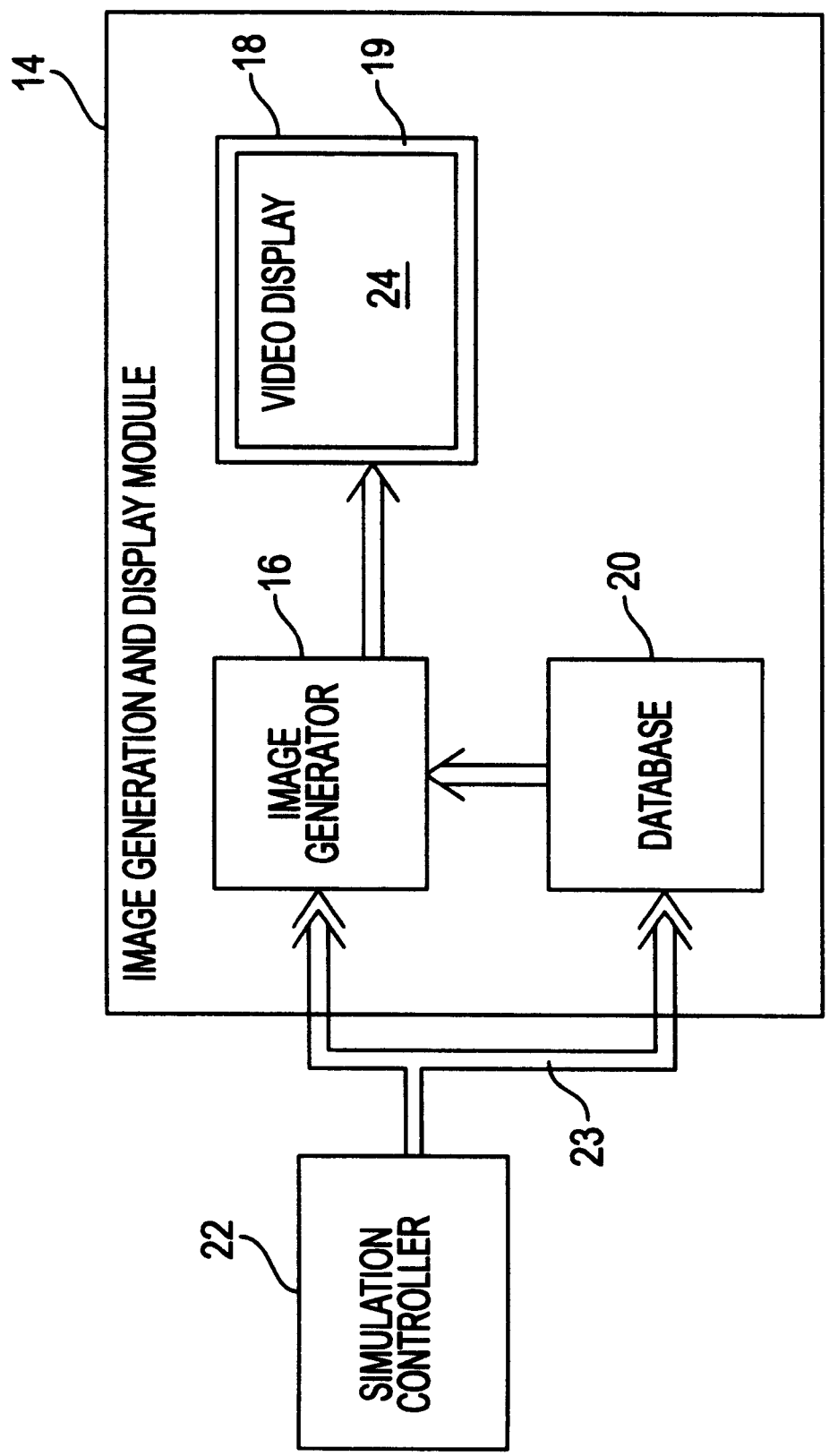
FIG. 2 is block diagram showing the presently preferred major components of one embodiment of the present invention.

FIG. 2 illustrates the major components of the presently preferred image generation and display module 14. Each module 14 preferably includes an image generator 16 coupled to a video display 18. The video display 18 may be, for example, a low cost flat panel display, such as a conventional liquid crystal display (LCD) having a back fluorescent light source as commonly employed in lap-top notebook or other portable computers. As is known, conventional LCDs include a small border 19 (typically as much as one inch) surrounding an active display area 24. While it is physically possible to tile an array of video displays 18 together, it is generally impossible using commercially-available low cost video displays having a border 19 to display a continuous image, as the image will be interrupted by the borders 19. The present invention solves this problem by incorporating an optical lens that restricts the pilot's view so that the pilot only views the image, or a fraction thereof, displayed in the active display area 24.

The image generator 16 receives data from a database 20, processes the data based on the simulated position of the pilot's aircraft, and generates a video image representative of a portion of the composite display image presented to the pilot 12. Each image generator 16 generates a portion of the composite display image associated with the position of the video display 18 associated with the image generator 16 within the array. Thus, each image generation and display module 14 has an associated address indicating its relative position within the array of modules 14 incorporated into the video display system 10. The module 14 uses this address to retrieve the appropriate data from the database 20 from which to generate the appropriate image for display at the module's location.

The image generator 16 may be a conventional single board computer, a desktop personal computer, a motherboard populated with appropriate computing devices, or any other similar commercially available computing apparatus capable of generating video images. As is known, the image generation and display module 14 will include other components that are not shown, such as a power supply, interface cards, video accelerator cards, hard disks, and other conventional components.

The database 20, which is preferably replicated in each of the image generation and display modules 14, includes a predefined three-dimensional structural database that is used by each of the image generators 16 to create the portion of the two-dimensional composite display image that will be displayed on the image generator's associated video display 18. In a preferred embodiment, the contents of the database are downloaded during initiation of the simulation session across a communication link into a memory unit contained within the module 14. In an alternative embodiment, only one copy of the database 20 may be provided and maintained in a central computer system (not shown) that is accessible by each of the image generators 16. In yet another embodiment, the database 20 (or portions thereof) may be updated during the simulation session from a central computer system. As will be appreciated by those skilled in the art, this embodiment requires a fast communication link so that the database may be retrieved by the image generators 16 from the stored database 20.

Preferably, the visual display system 10 includes a simulation controller 22 that provides overall control of the flight simulation. The simulation controller 22 allocates a particular portion of the overall composite display image to each of the image generation and display modules 14 and provides a viewing location defining an address into the database 20 storing the data and information necessary for a particular image generation and display module 14 to generate and display a portion of the overall composite display image. The simulation controller 22 may communicate with each image generation and display modules 14 via a wide band communication link 23, such as, for example, an Ethernet type communication bus.

Figure 3:
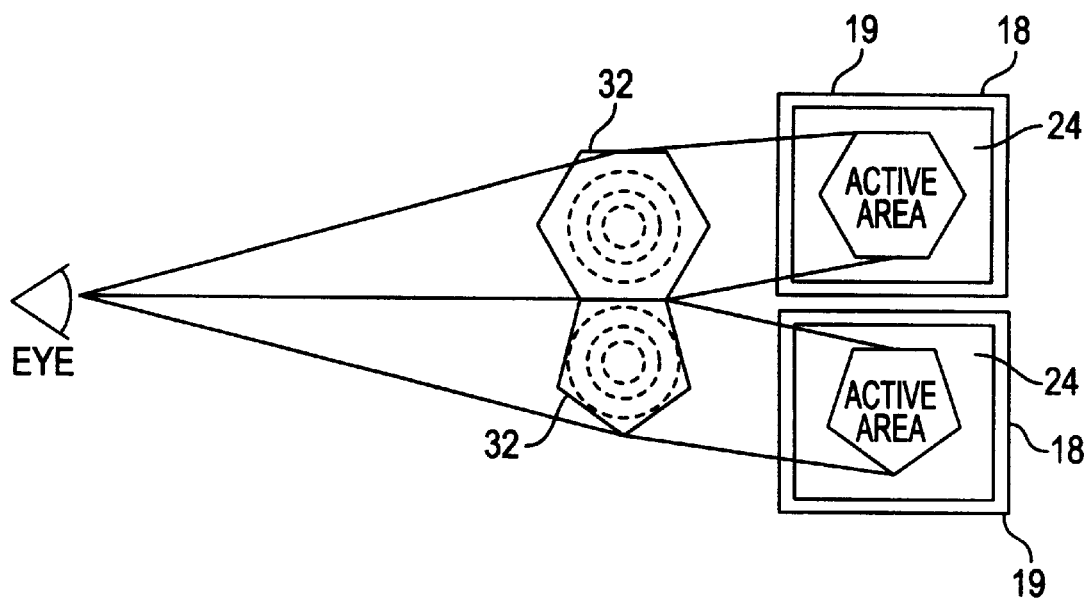
FIG. 3 is a representative diagram showing a preferred optical lens in accordance with one embodiment of the present invention.

Each video display 18 is associated with a lens, preferably a positive aspheric optical lens 32 and, most preferably, a Fresnel type lens having a planar surface. As is commonly known, a Fresnel lens is a thin replica of a plano lens cut into rings to obtain a flat profile. Each optical lens 32 is preferably mounted to a structural module 15 that also holds one of the image generation and display modules 14. Preferably, the optical lens 32 is mounted parallel to the surface of the video display 18 with its optical axis pointed toward the simulation pilot 12. FIG. 3 illustrates how the lens 32 preferably restricts the field of view of the pilot 12 and refracts the view point of the pilot 12 so that the pilot 12 only views a portion of the active display area 24 of the video display 18. The optical lens 32 restricts the pilot's view so that he only sees a portion of the entire image displayed on a particular video display 18. Thus, some of the image generated and displayed on the video display 18 is displayed outside of the portion of the active display area 24 viewed by the pilot 12 through the optical lens 32 to accommodate continuous imagery as the pilot 12 moves or rotates his head. Preferably, the image displayed on a particular video display 18 overlaps the image displayed on adjacent video displays 18 to further accommodate situations in which the pilot 12 moves or rotates his head. By having each video display 18 display partially overlapping images, the pilot 12 continuously views a composite virtual image. For purposes of simplicity, FIG. 3 only illustrates two video displays 18 and associated lenses 32.

The focal length of the lens 32 is preferably optimized for the particular size of the simulator, the size of the video displays 18 and to accommodate the operator's anticipated head movement and is selected based on two conjugate distances: the distance from the pilot's viewing position to the lens 32 and the distance from the lens 32 to the video display 18. These two conjugate distances are then adjusted for apparent virtual image location based on desired view distance and dome tessellation and determine the field of view available to the pilot 12. Thus, the focal length of the lens 32 is designed such that the portion of the image viewed through the lens 32 is perceived to be at a predetermined distance.

Preferably, the lens 32 has a profiled surface structure in the form of grooves extending with a circular symmetry relative to the optical axis of the lens 32, i.e., perpendicular to the surface of the lens 32. The preferred Fresnel type lens used in the present invention may be formed on a suitable transparent material such as acrylic or glass, in accordance with well-known pressing and cutting operations. Each lens 32 may be manufactured as one large lens and then machined into the proper size and shape.

The image displayed on the video display 18 is viewed by the pilot 12 through the optical lens 32. The video displays 18 are arranged and positioned at a distance from the predetermined viewing position of the pilot 12 such that the image displayed on them is at focus or slightly inside of focus. Thus, the image seen by the pilot 12 through the lens 32 requires the eyes to slightly converge (or be parallel), allowing the pilot 12 to perceive a far-focused or collimated virtual image. Thus, the image is perceived to be at distance from the pilot 12 that is greater than the distance between the pilot 12 and the video display 18.

Each video display 18 is arranged with its associated lens 32 such that the surfaces of the video display 18 and optical lens 32 are parallel with the center of each lens 32 perpendicular to the line of sight of the pilot 12. Preferably, the distance from the pilot 12 to each of the lenses 32 is uniform for all of the lenses 32 incorporated into the visual display system 10. Alternatively, particularly for use with systems having a large field of view, the distance from the pilot 12 to each of the lenses 32 may not be uniform. The array of modules 14 form an enclosure, or partial enclosure, surrounding the pilot 12 so that the simulation pilot 12 views the continuous virtual image from inside the enclosure.

Figure 4:
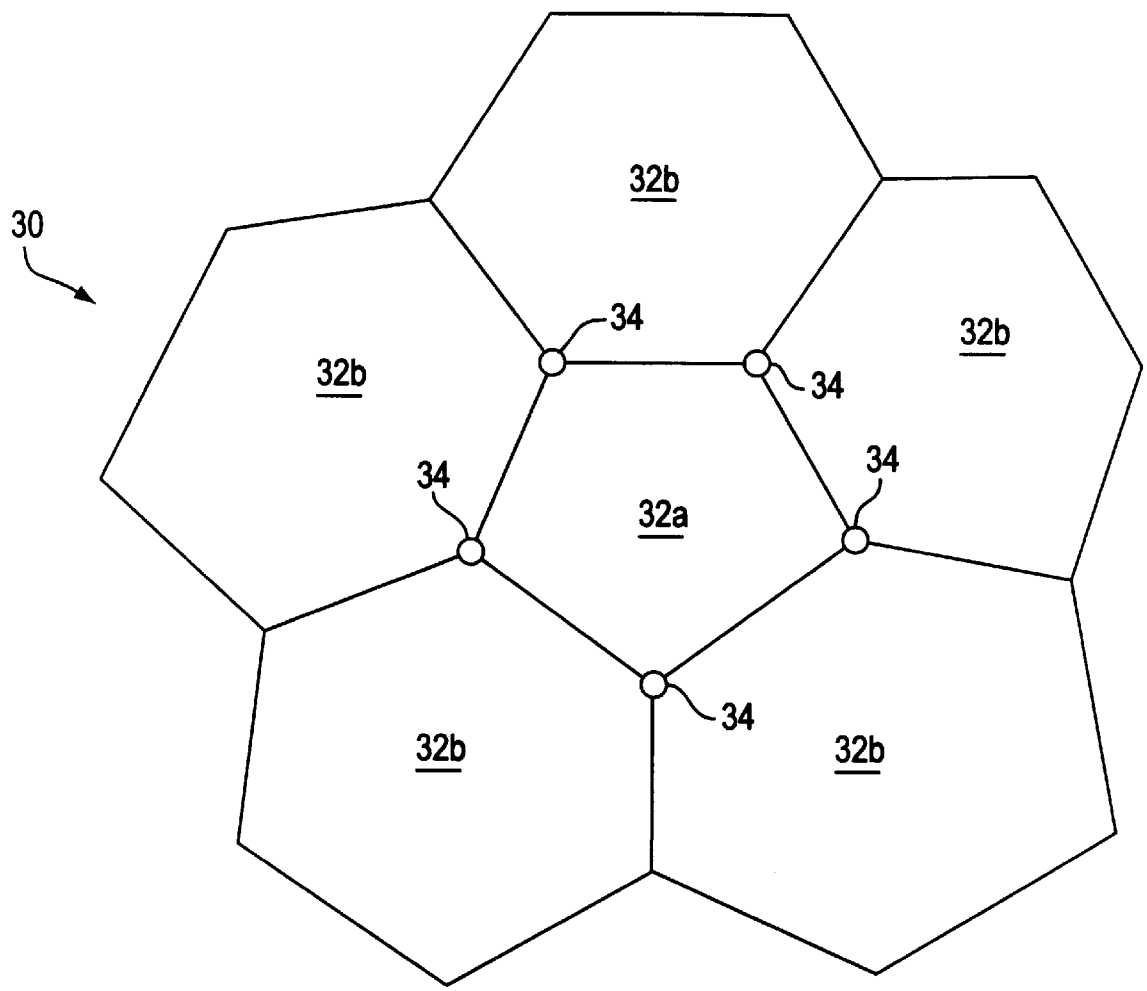
FIG. 4 is an illustration showing six optical lenses arranged in accordance with one embodiment of the present invention.

Preferably, each optical lens 32 is shaped into a five- or six-sided lens to allow them to be joined together to form a spherical-like structure. FIG. 4 shows a front view of an array of six lenses 32 mounted edge to edge. Each of the lenses 32 is preferably arranged such that its surface is substantially perpendicular to the pilot's line of sight. The array of lenses illustrated in FIG. 4 may thus be used to form a partial enclosure placed in front of the pilot 12. As will be appreciated, this array of optical lenses may be expanded to form a larger partial enclosure encircling the pilot 12 or, using an appropriate number of lenses, may form a complete enclosure completely surrounding the pilot 12. The lenses 32 are preferably machined and aligned edge to edge with their adjacent lenses. A connecting element 34, such as a fastener or adhesive, may preferably be used to hold the lenses in place. The image generation and display modules 14 are located behind each of the optical lenses 32. Thus, the video display system 10 may include as many image generation and display modules 14 (and associated optical lenses 32) as required to obtain the desired viewing angle. The representative array of six lenses illustrated in FIG. 4 has about a 50 degree solid viewing angle. This array is formed using one pentagon-shaped center lens 32a and five hexagon shaped surrounding lenses 32b. As the desired viewing angle increases, more image generation and display modules 14 will be incorporated into the video display system 10. As known to those skilled in the art, the tessellation of a partial or complete sphere with flat surfaces has many solutions. One preferred solution uses a combination of three differently shaped hexagonal shaped lenses and one perfect pentagonal shaped lens. Of course, many other solutions are available and are within the scope of the present invention.

Preferably, the visual display system 10 includes a number of image generation and display modules 14 coupled together to provide the continuous virtual image to the pilot 12. The number of modules 14 required for a particular application is dependent on a number of factors, including the total angle of view desired to be provided to the operator and the size of the video displays 18. Preferably, the modules 14 are designed as stand-alone, replaceable modules that allow for rapid maintenance or replacement.

Although the present invention has been described in considerable detail with reference to certain preferred embodiments thereof, other embodiments are possible. Therefore, the scope of the appended claims should not be limited to the description of the preferred embodiments contained herein.

We claim:

1. A visual display system for producing a composite display image perceived as a continuous far-focused virtual image by an operator positioned in a predetermined viewing volume and having an associated field of view concentrically surrounding a line of sight extending outwardly from the operator's viewing volume, the display system comprising:
    a plurality of adjacent video image generation and display modules, each module comprising:
        an image generator that generates a video image, wherein the video image is representative of a portion of the composite display image; and
        a video display, operatively connected to the image generator and responsive to the video image generated by the image generator, that displays the portion of the composite display image, wherein the video display comprises a border surrounding a display area; and
    a plurality of adjacent lenses, each lens associated with one module and positioned between the operator and the video display, wherein each lens restricts the operator's field of view such that the operator views only a portion of the display area of the video display;
    wherein the lens associated with adjacent modules are joined together along their edges to form an enclosure partially surrounding the operator so that the operator views the composite display image displayed on the plurality of video displays through the plurality of lenses and perceives the composite display image as a continuous far-focused virtual image.

2. The visual display system of claim 1 wherein the portion of the composite display image displayed on each video display overlaps the portion of the composite display image displayed on adjacent video displays and wherein each lens is positioned such that the portion of the display area viewed by the operator through the lens does not overlap any of the portion of the display area viewed by the operator through adjacent lenses.

3. The visual display system of claim 1 wherein each of the plurality of lenses has an associated focal length designed such that the portion of the composite display image viewed through the lenses is focused at a desired distance.

4. The visual display system of claim 1 wherein each of the plurality of lenses comprises a planar surface having five or six sides.

5. The visual display system of claim 4 wherein the sides of the lens completely intersect with the sides of their adjacent lenses.

6. The visual display system of claim 4 wherein each of the plurality of lens is oriented parallel to its associated video display and substantially perpendicular to a line extending from the operator's viewing volume to the center of the associated video display.

7. The visual display system of claim 1 wherein the plurality of lenses are shaped and positioned to tessellate a sphere partially surrounding the operator.

8. The visual display system of claim 1 wherein each of the plurality of lenses comprises a positive aspheric lens mounted in front of one of the video displays.

9. The visual display system of claim 8 wherein the positive aspheric lens is a Fresnel type lens.

10. The visual display system of claim 1 wherein each image generation and display module further comprises a database comprising data accessed by the image generator to generate the video image, the display system further comprising a display system controller for providing each module with an index into the database so that the image generator can access data associated with the portion of the composite video image displayed on the video display.

11. The visual display system of claim 1 wherein the video display comprises flat-panel displays.

12. A visual display system for use as part of an aircraft flight simulator operated by a simulation pilot, the visual display system producing a composite display image perceived as a far-focused continuous virtual image by the simulation pilot positioned in a predetermined viewing volume and having an associated field of view concentrically surrounding a line of sight extending outwardly from the simulation pilot's viewing volume, the display system comprising:
    a plurality of adjacent video image generation and display modules, each module comprising:
        an image generator that generates a video image, wherein the video image is representative of a portion of the composite display image; and a video display, operatively connected to the image generator and responsive to the video image generated by the image generator for displaying the portion of the composite video image, wherein the video display comprises a border surrounding a display area; and a plurality of adjacent lenses, each lens associated with one module and positioned between the simulation pilot and the video display, wherein each lens restricts the simulation pilot's field of view such that the simulation pilot views only a portion of the display area of the video display;

wherein the lenses associated with adjacent modules are joined together along their edges to form an enclosure partially surrounding the simulation simulation pilot so that the pilot views the composite display image displayed on the plurality of video displays through the plurality of lenses and perceives the composite display image as a continuous far-focused virtual image.

13. The visual display system of claim 12 wherein the portion of the composite display image displayed on each video display overlaps the portion of the composite display image displayed on adjacent video displays and wherein each lens is positioned such that the portion of the display area viewed by the simulation pilot through the lens does not overlap any of the portion of the display area viewed by the simulation pilot through adjacent lenses.

14. The visual display system of claim 12 wherein each of the plurality of lenses has an associated focal length designed such that the portion of the composite display image viewed through the lenses is focused at a desired distance.

15. The visual display system of claim 12 wherein each of the plurality of lenses comprises a planar surface having five or six sides.

16. The visual display system of claim 15 wherein the sides of the lenses completely intersect with the sides of their adjacent lenses.

17. The visual display system of claim 15 wherein each of the plurality of lenses is oriented parallel to its associated video display and substantially perpendicular to a line extending from the simulation pilot's viewing volume to the center of the associated video display.

18. The visual display system of claim 12 wherein the plurality of lenses are shaped and positioned to tessellate a sphere partially surrounding the simulation pilot.

19. The visual display system of claim 12 wherein each of the plurality of lenses comprises a positive aspheric lens mounted in front of one of the video displays.

20. The visual display system of claim 19 wherein the positive aspheric lens is a Fresnel type lens.

21. The visual display system of claim 12 wherein each video image generation and display module further comprises a database comprising data accessed by the image generator to generate the video image, the display system further comprising a display system controller for providing each module with an index into the database so that the image generator can access data associated with the portion of the composite video image displayed on the video display.

22. The visual display system of claim 12 wherein the video displays comprise flat-panel displays.

23. The visual display system of claim 12 further comprising a flight simulation controller for controlling the video image generated by the plurality of image generators in response to control signals provided by the simulation pilot.

24. A method for producing a composite display image perceived as a continuous far-focused virtual image by an operator positioned in a predetermined viewing volume and having an associated field of view concentrically surrounding a line of sight extending outwardly from the operator's viewing volume, the method comprising the steps of:

generating a plurality of video images, wherein each video image is representative of a portion of the composite display image;

arranging a plurality of adjacent video displays that display one of the plurality of video images, wherein the video displays each comprise a border surrounding a display area;

arranging a plurality of adjacent lenses, each lens associated with one video display and positioned between the operator and the video display, wherein each lens restricts the operator's field of view such that the operator views only a portion of the display area of the video display;

arranging adjacent lenses such that their edges are joined together to form an enclosure partially surrounding the operator so that the operator views the continuous far-focused virtual image displayed on the plurality of video display through the plurality of lenses.

25. The method of claim 24 wherein the portion of the composite display image displayed on each video display overlaps the portion of the composite display image displayed on adjacent video displays and wherein each lens is positioned such that the portion of the display area viewed by the operator through the lens does not overlap any of the portion of the display area viewed by the operator through adjacent lenses.

* * * * *